(12) United States Patent
Mao et al.

(10) Patent No.: US 12,277,274 B1
(45) Date of Patent: Apr. 15, 2025

(54) HAPTIC VIBRATION DEVICE, TERMINAL DEVICE AND CONTROL METHOD

(71) Applicant: AAC Microtech (Changzhou) Co., Ltd., Jiangsu (CN)

(72) Inventors: Lubin Mao, Changzhou (CN); Jie Ma, Changzhou (CN); Yun Tang, Changzhou (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 0 days.

(21) Appl. No.: 18/399,619

(22) Filed: Dec. 28, 2023

Related U.S. Application Data

(63) Continuation of application No. PCT/CN2023/126866, filed on Oct. 26, 2023.

(51) Int. Cl.
*G06F 3/01* (2006.01)
*G06F 3/041* (2006.01)

(52) U.S. Cl.
CPC ............ *G06F 3/016* (2013.01); *G06F 3/0416* (2013.01)

(58) Field of Classification Search
CPC .............................. G06F 3/016; G06F 3/0416
See application file for complete search history.

(56) References Cited

U.S. PATENT DOCUMENTS

| 2012/0108299 | A1* | 5/2012 | Yang | ................... | H02K 33/16 |
| | | | | | 455/567 |
| 2020/0212783 | A1* | 7/2020 | Ling | ................... | H02K 33/16 |

* cited by examiner

*Primary Examiner* — Jonathan A Boyd
(74) *Attorney, Agent, or Firm* — W&G Law Group

(57) ABSTRACT

A haptic vibration device includes a stator assembly, a vibrator assembly, and a touch-control assembly. The touch-control assembly can detect a pressing information in a first direction. The stator assembly includes a fixing frame assembly, and a magnetic circuit system fixed to the fixing frame assembly and having a magnetic gap. The vibrator assembly includes a shell elastically connected to the fixing frame assembly and provided outside the magnetic circuit system, and a solenoid assembly located in the magnetic gap. The magnetic circuit system can drive the solenoid assembly to reciprocate in a second direction with an angle to the first direction. A terminal and a control method are provided. The haptic vibration device can reduce the effect of the driving force in the non-pressing direction on the whole device, and has small space requirement for the terminal device in the pressing direction, and is suitable for various terminal devices.

9 Claims, 9 Drawing Sheets

HAPTIC VIBRATION DEVICE, TERMINAL DEVICE AND CONTROL METHOD

CROSS-REFERENCE TO RELATED APPLICATIONS

This application is a continuation of International Patent Application No. PCT/CN2023/126866, filed on Oct. 26, 2023. The content of the aforementioned application, including any intervening amendments made thereto, is incorporated herein by reference in its entirety.

TECHNICAL FIELD

The present application relates to linear motors, and more particularly to a haptic vibration device, a terminal device and a control method.

BACKGROUND

Motion feedback (e.g., active force and resistance feedback) and tactile feedback (e.g., vibration and heat) are both known as "haptic feedback". The haptic feedback provides the user with a more intense experience, and has been applied to a variety of terminals, such as cell phones, controllers, XRs, earphones, and steering wheels.

In the related technology, manufactures often adopt a linear vibration motor to provide the user's vibration tactile feedback, and the user needs to displace the button in the pressing direction by a certain distance to activate the vibration motor. The displacement in the pressing direction affects the driving force of the vibration motor in the non-pressing direction, resulting in experience differences among different terminal devices.

SUMMARY

An object of the present application is to provide a haptic vibration device, a terminal device and a control method. In the haptic vibration device provided herein, the touching operation in the pressing direction does not affect the driving force provided in a non-pressing direction.

Technical solutions of this application will be specifically described below.

In a first aspect, this application provides a haptic vibration device, which is configured to be electrically connected to a terminal device, and comprises:
  a stator assembly for fixing with the terminal device;
  a vibrator assembly arranged spacedly at a side of the stator assembly; and
  a touch-control assembly connected to a side of the vibrator assembly away from the stator assembly;
  wherein the touch-control assembly is configured to detect a pressing information in a first direction;
  the stator assembly comprises a fixing frame assembly for fixing with the terminal device, and a magnetic circuit system fixed to the fixing frame assembly; and the magnetic circuit system has a magnetic gap therein;
  the vibrator assembly comprises a shell and a solenoid assembly; the shell is elastically connected to the fixing frame assembly, and is provided outside the magnetic circuit system; the solenoid assembly is fixed to the shell, and is located in the magnetic gap; the magnetic circuit system is configured to drive the solenoid assembly to reciprocate in a second direction; and there is an angle between the first direction and the second direction.

In some embodiments, the fixing frame assembly comprises a bottom plate for fixing with the terminal device, and a fixing frame; the fixing frame is fixedly connected to a side of the bottom plate facing toward the vibrator assembly; the fixing frame has a ring shape; and the shell is elastically connected to two ends of the fixing frame in the second direction, and is provided outside the fixing frame.

In some embodiments, the fixing frame has a ring shape; each of two side walls of the fixing frame perpendicular to the second direction is configured to extend toward the vibrator assembly to form an extension portion; and the magnetic circuit system is fixed to an inner wall of the extension portion.

In some embodiments, the shell comprises a top plate spaced from the fixing frame assembly, and two side plates respectively extending from two ends of the top plate toward the stator assembly; the two side plates are elastic; and the two side plates are elastically connected to the fixing frame assembly in the second direction.

In some embodiments, the solenoid assembly comprises a pole core fixed to the top plate, and a plurality of coils sleeved on the pole core; the magnetic circuit system comprises a plurality of magnets fixed to the fixing frame assembly; and the plurality of magnets are distributed on two sides of the plurality of coils with the pole core as an axis.

In some embodiments, a magnetizing direction of each of the plurality of magnets is perpendicular to the second direction; and a magnetizing direction of one of the plurality of magnets located at one side of the plurality of coils is opposite to a magnetizing direction of one of the plurality of magnets located at the other side of the plurality of coils. In some embodiments, the touch-control assembly comprises a sensor and a button; the sensor is connected to a side of the vibrator assembly away from the stator assembly; and the button is configured to cover a side of the sensor away from the vibrator assembly.

In a second aspect, this application also provides a terminal device, comprising:
  a casing; and
  the haptic vibration device;
  wherein the haptic vibration device is arranged in the casing; and an outer side of the haptic vibration device is exposed from an outer surface of the casing.

In some embodiments, the touch-control assembly protrudes from a surface of the casing; and the stator assembly is fixed to the casing.

In a third aspect, this application further provides a control method applied to the above haptic vibration device, comprising:
  detecting, by the touch-control assembly, a pressing information in the first direction; and calling an effect signal from an effect library according to the pressing information; and
  determining a driving parameter according to the effect signal; and generating a vibration signal to drive the vibrator assembly to vibrate according to the driving parameter.

Compared to the prior art, this application has the following beneficial effects.

Regarding the haptic vibration device provided herein, when a user presses the touch-control assembly, the touch-control assembly detects the pressing information in the first direction. The magnetic circuit system provides a driving force to drive the solenoid assembly to reciprocate in the second direction, which enables the vibrator assembly as a whole to reciprocate in the second direction. The touch-control assembly is connected to the vibrator assembly, and the first direction has an angle to the second direction, such that the user can experience the vibration sensation in the second direction while pressing the touch-control assembly in the first direction. This design can reduce the influence on the driving force of the haptic vibration device in the non-pressing direction, and has a small space requirement for the terminal device in the pressing direction, and can be adapted to a variety of terminal devices.

DETAILED DESCRIPTION OF THE EMBODIMENTS

Figure 1:
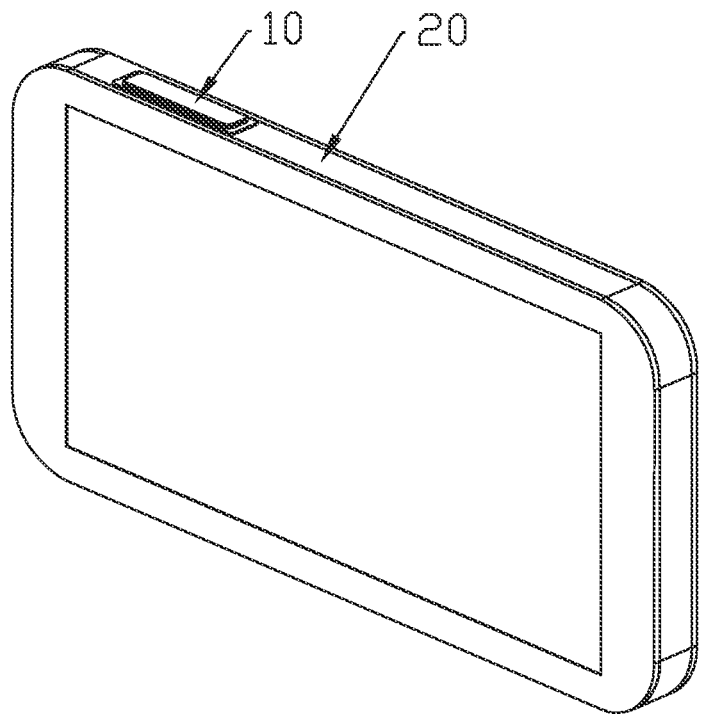
FIG. 1 is a structural diagram of a haptic vibration device according to an embodiment of this application after installed in a terminal device.

The present application will be described clearly and completely below with reference to the accompanying drawings and embodiments.

Referring to FIGS. 1-8, an embodiment of this application provides a haptic vibration device 10, which is configured to be electrically connected to a terminal device. The haptic vibration device 10 includes a stator assembly 11 fixed to the terminal device, a vibrator assembly 12 arranged spacedly at a side of the stator assembly 11, and a touch-control assembly 13 connected to a side of the vibrator assembly 12 away from the stator assembly 11. The touch-control assembly 13 is configured to detect a pressing information in a first direction.

The stator assembly 11 includes a fixing frame assembly 111 for fixing with the terminal device, and a magnetic circuit system fixed to the fixing frame assembly 111; and the magnetic circuit system has a magnetic gap therein.

The vibrator assembly 12 includes a shell 121 and a solenoid assembly 122; the shell 121 is elastically connected to the fixing frame assembly 111, and is provided outside the magnetic circuit system; the solenoid assembly 122 is fixed to the shell 121, and is located in the magnetic gap; the magnetic circuit system is configured to drive the solenoid assembly 122 to reciprocate in a second direction; and there is an angle between the first direction and the second direction.

In this embodiment, it can be understood that the stator assembly 11 and the vibrator assembly 12 together form a vibration motor. When the user presses the touch-control assembly 13, the touch-control assembly 13 detects the pressing information in the first direction, and the magnetic circuit system provides the driving force for the solenoid assembly 122 to reciprocate in the second direction, such that the vibrator assembly 12 can reciprocate as a whole in the second direction. Since the touch-control assembly 13 is connected to the vibrator assembly 12, and the first direction has an angle to the second direction, the user can experience the vibration sensation in the second direction while pressing the touch-control assembly 13 in the first direction. This design can reduce the influence on the driving force of the haptic vibration device 10 in the non-pressing direction, and has a small space requirement for the terminal device in the pressing direction, and can be adapted to a variety of terminal devices.

It can be understood that the first direction may be z-direction, and the second direction may be x-direction or y-direction.

Figure 6:
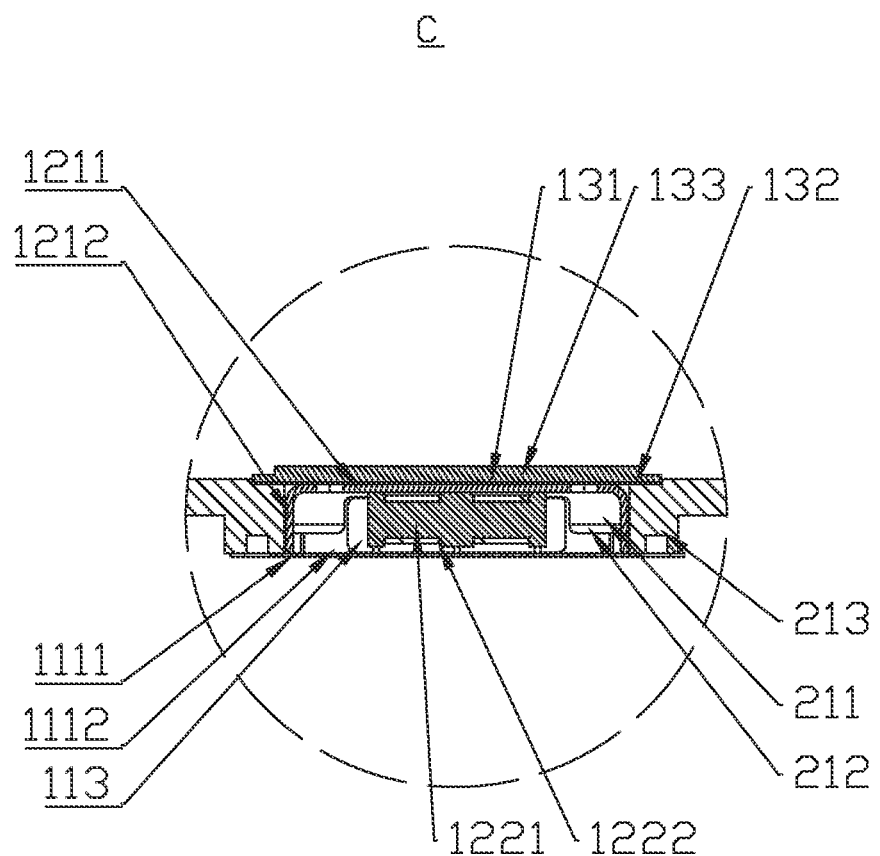
FIG. 6 is an enlarged view of part C in FIG. 5.
Figure 7:
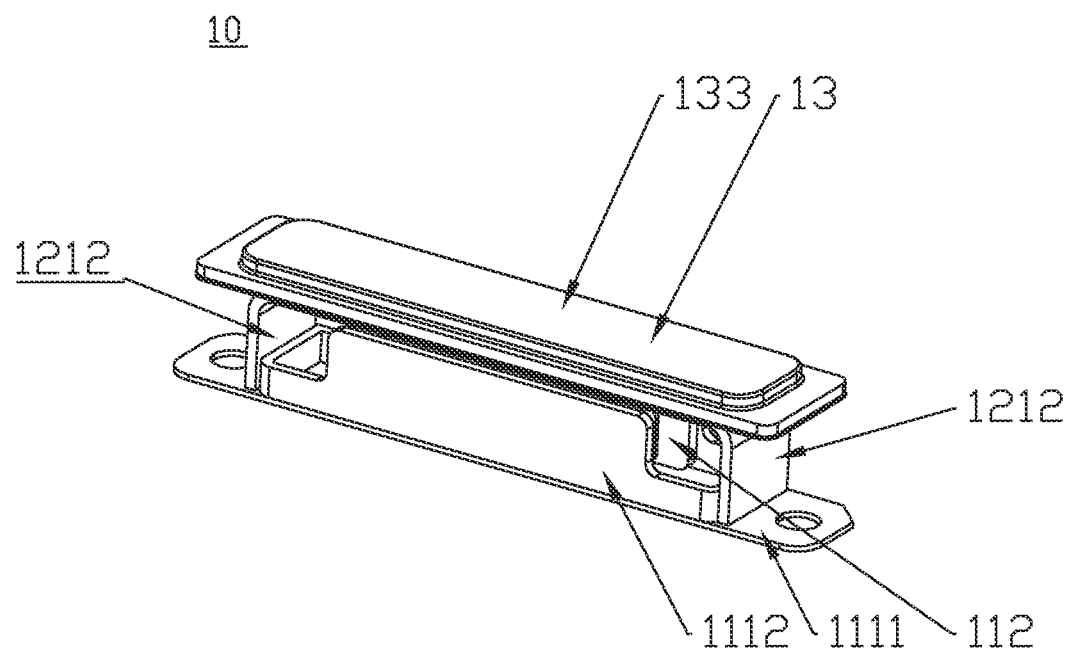
FIG. 7 is a perspective view of the haptic vibration device according to an embodiment of this application.
Figure 8:
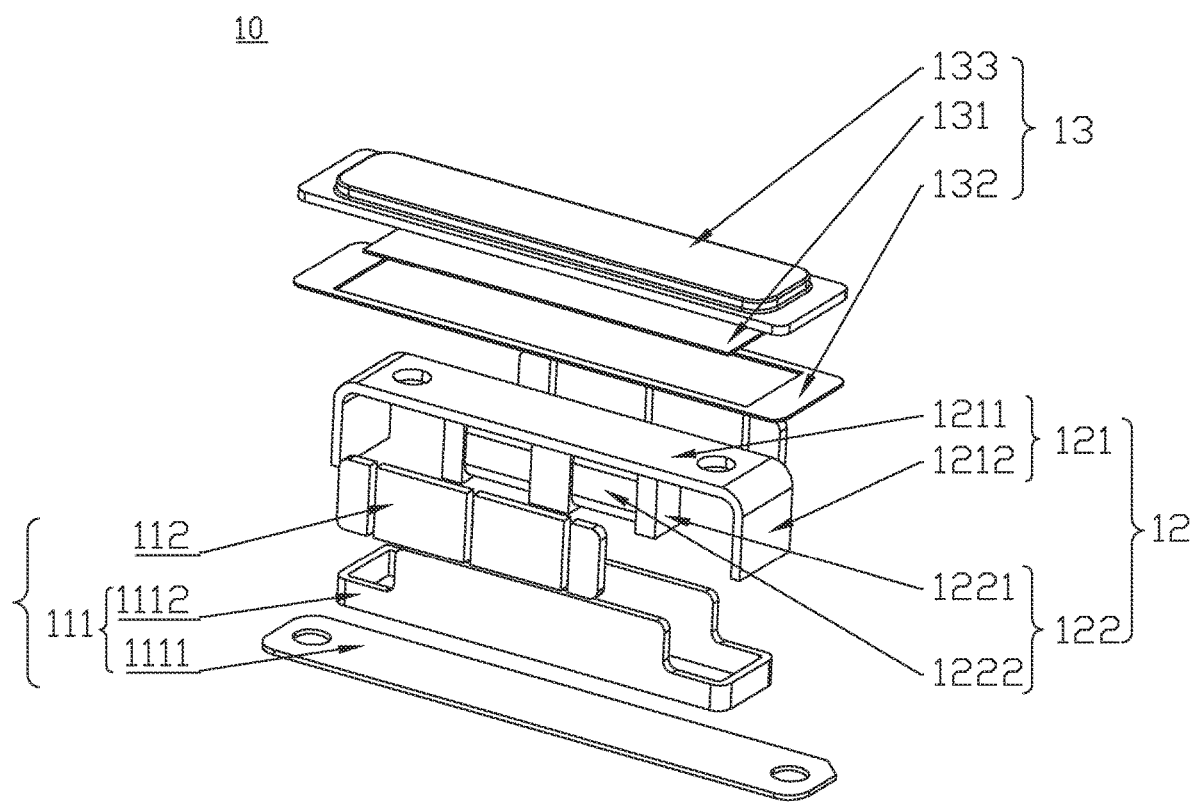
FIG. 8 is an exploded view of the haptic vibration device according to an embodiment of this application.

Further, referring to FIGS. 6-8, the fixing frame assembly 111 includes a bottom plate 1111 for fixing with the terminal device, and a fixing frame 1112; the fixing frame 1112 is fixedly connected to a side of the bottom plate 1111 facing toward the vibrator assembly 12; the fixing frame 1112 has a ring shape; and the shell 121 is elastically connected to two ends of the fixing frame 1112 in the second direction, and is provided outside the fixing frame 1112.

In this embodiment, the bottom plate 1111 is a rectangular metal plate with a length extension direction parallel to the second direction. The fixing frame 1112 is sticked to the bottom plate 1111, and its projection in the direction facing the bottom plate 1111 is located within the bottom plate 1111. The fixing frame 1112 is a rectangular frame, and its short side is perpendicular to the second direction. The shell 121 is elastically connected to the short side of the fixing frame 1112, and is provided outside the short side of the fixing frame 1112. The magnetic circuit system is fixed between the two opposite long sides of the fixing frame 1112, which is conducive to fixing the magnetic circuit system in the fixing frame 111 and forming the magnetic gap.

In other embodiments, the fixing frame 1112 may be also be fixed to the bottom plate 1111 by means of snap-fit or integral molding, and the fixing frame 112 may not necessarily be a rectangular frame, as long as the center of the fixing frame 1112 has a space for fixing the magnetic circuit system and is capable of forming the magnetic gap with a certain spacing.

Further, referring to FIG. 8, each of two side walls of the fixing frame 1112 perpendicular to the second direction is configured to extend toward the vibrator assembly 12 to form an extension portion; and the magnetic circuit system is fixed to an inner wall of the extension portion.

In this embodiment, the middle of each of the two opposite long sides of the fixing frame 1112 extends toward the vibrator assembly 12 to form the extension portion. The two extension portions fix the magnetic circuit system, and also form the magnetic gap. The solenoid assembly 122 can vibrate between the two extension portions when energized.

Further, referring to FIG. 8, the shell 121 includes a top plate 1211 spaced from the fixing frame assembly 111, and two side plates 1212 respectively extending from two ends of the top plate 1211 toward the stator assembly 11; the two side plates 1212 are elastic; and the two side plates 1212 are elastically connected to the fixing frame assembly 111 in the second direction.

In this embodiment, the top plate 1211 extends lengthwise in a direction parallel to the second direction, and is provided parallel to the bottom plate 1111 of the fixing frame assembly 111. The two side plates 1212 extending from the ends of the top plate 1211 in the direction toward the stator assembly 11 are perpendicular to the top plate 1211. The short sides at two ends of the fixing frame 1112 abut against opposite inner walls of the two side plates 1212. Specifically, when the magnetic circuit system drives the solenoid assembly 122 to reciprocate in the second direction, the shell 121 reciprocates with the solenoid assembly 122 in the second direction. The side plates 1212 of the shell 121 are elastically connected to fixing frame 1112, making the shell 121 to produce vibration.

The shell 121 is not only used to fix the solenoid assembly 122, but also used to make an elastic connection between the stator assembly 11 and the vibrator assembly 12, which plays the role of an elastic component in the vibration motor. Compared to the vibration motor in the related technology, the structure of the shell 121 in this embodiment is ingenious, and greatly simplifies the structure of the elastic component in the vibration motor.

As can be known, the top plate 1211 and the two side plates 1212 can be integrally molded, and the shell 121 can be made of an elastic metal material such as stainless steel.

Further, referring to FIGS. 6 and 8, the solenoid assembly 122 includes a pole core 1221 fixed to the top plate 1211 and a plurality of coils 1222 sleeved on the pole core 1221; the magnetic circuit system includes a plurality of magnets 112 fixed to the fixing frame assembly 111; the plurality of magnets 112 are distributed on both sides of the coils 1222 with the pole core 1221 as an axis to form two groups of magnets 112, and the magnetic gap is formed between the two groups of magnets 112.

In this embodiment, the pole core 1221 includes a plurality of fixed portions fixed to the side of the top plate 1211 facing the stator assembly 11 and a connection portion fixed between two adjacent fixed portions. The plurality of fixed portions are arranged spaced apart in the second direction. The coils 1222 are sleeved on the connection portions, respectively. The plurality of magnets 112 are provided in correspondence with the coils 1222, and fixed to the extension portions. Preferably, the magnets 112 are symmetrically distributed on both sides of the coils 1222 along a third direction with the pole core 1221 as an axis, and the third direction is angled with both the first direction and the second direction. Optionally, the third direction is perpendicular to the first direction and the second direction. Optionally, each magnet 112 is glued and fixed to the fixing frame assembly 111. In other embodiments, the plurality of magnets 112 may also be asymmetrically distributed on both sides of the coil 1222.

Further, referring to the figures, the magnetizing direction of each magnet 112 is perpendicular to the second direction, and a magnetizing direction of one of the plurality of magnets located at one side of the plurality of coils is opposite to a magnetizing direction of one of the plurality of magnets located at the other side of the plurality of coils.

In this embodiment, the first direction is perpendicular to the second direction, the magnetizing direction of the magnets 112 is perpendicular to the vibration direction of the vibrator assembly 12, and the magnetizing directions of the two magnets 112 are opposite, i.e., the poles of the two magnets 112 are opposite in the direction corresponding to the coils 1222, so that a stable magnetic field passing through the coils 1222 can be formed between the two magnets 112, and the coils 1222, after being energized, a driving force is generated to drive the vibrator assembly 12 to make a reciprocating motion in the second direction.

Further, referring to FIGS. 7 and 8, the touch-control assembly includes a sensor 131 connected to a side of the vibrator assembly 12 away from the stator assembly 11, and a button 133 covering the side of the sensor 131 away from the vibrator assembly 12.

In this embodiment, the sensor 131 is fixed to the side of the top plate 1211 away from the fixing frame assembly 111. Specifically, the sensor 131 is glued and fixed to the top plate 1211. The top plate 1211 is provided with a plurality of through holes. Specifically, two through holes are provided evenly spaced apart on the top plate 1211, and the through holes are configured for the connecting wires of the sensor 131 to pass through.

It can be understood that the sensor 131 may be a sheet pressure sensor, such as a thin film sensor, preferably a two-dimensional or more single-point pressure sensor or a multi-point pressure sensor. The two-dimensional single-point sensor is capable of detecting pressure in the first direction and the second direction, i.e., correspondingly capable of detecting the two types of actions, namely, the sliding and pressing, made by the user on the touch-control assembly 13. The magnetic circuit system is designed to provide different vibration frequencies for different actions, further providing different vibration sensations for the user. Preferably, the sensor 131 is a flexible thin-film sensor, which can be applied to different terminal devices, and reduce the use differences of the haptic vibration device 10 on different terminal devices.

Figure 2:
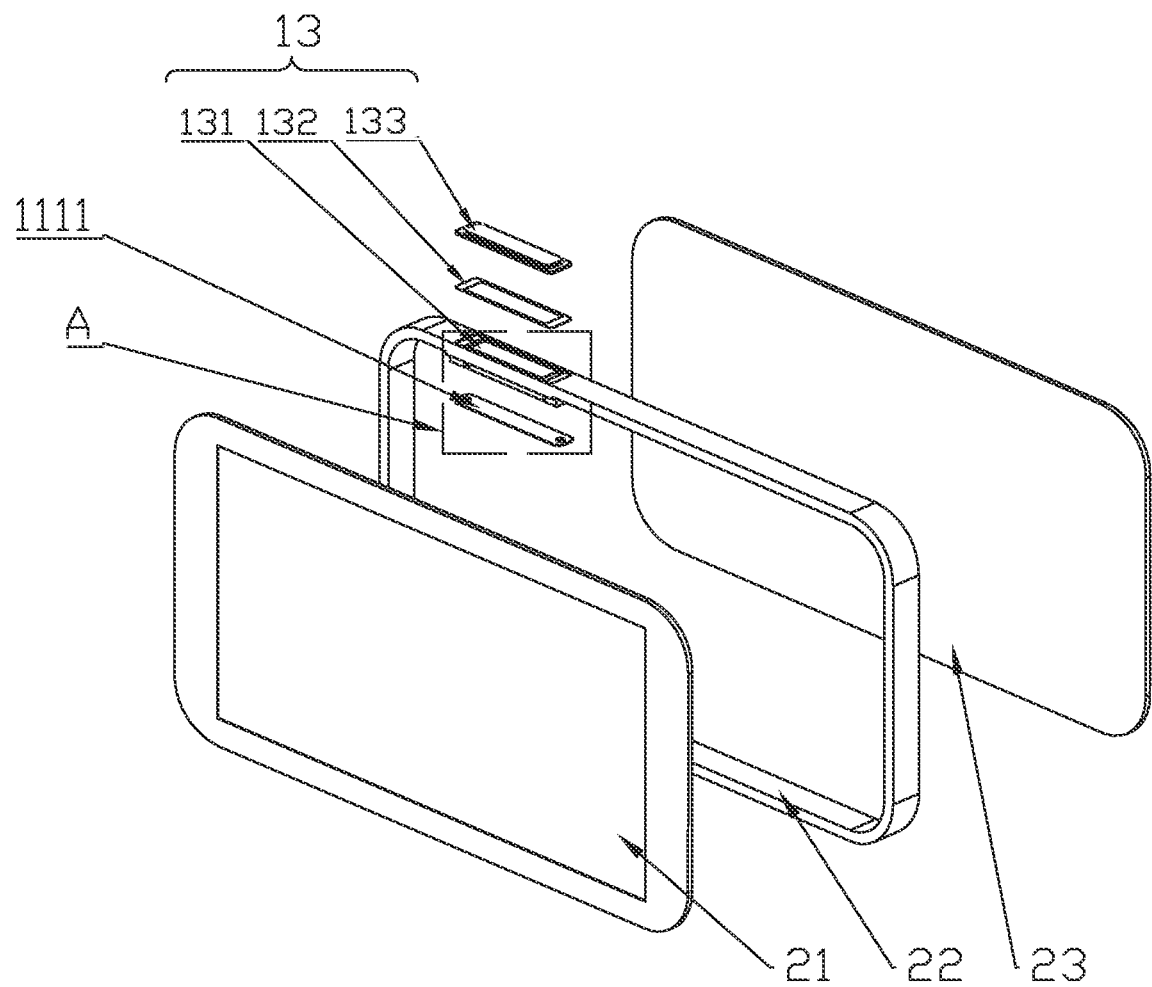
FIG. 2 is an exploded view of the haptic vibration device according to an embodiment of this application after installed in a terminal device.
Figure 3:
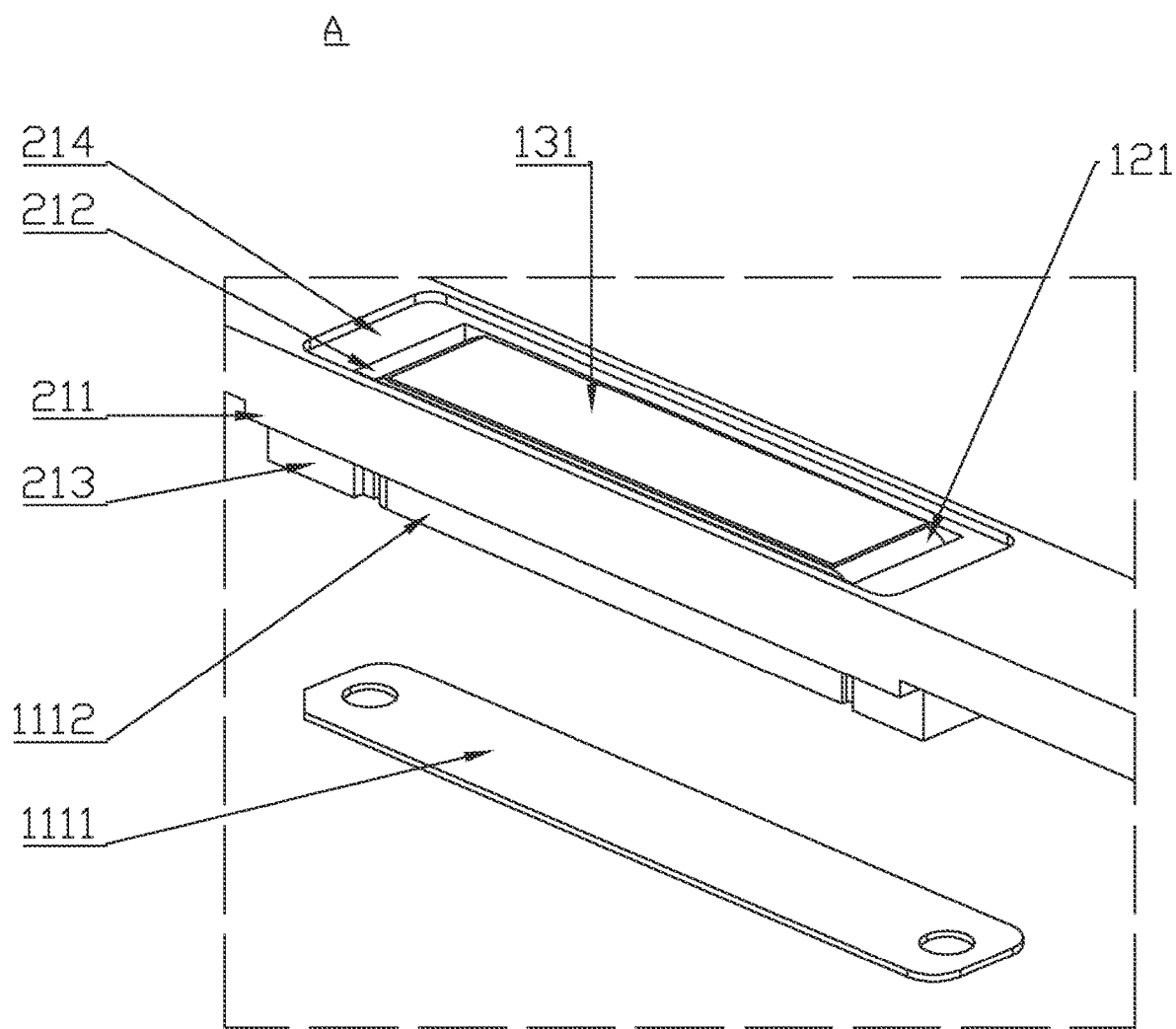
FIG. 3 is an enlarged view of part A in FIG. 2.
Figure 4:
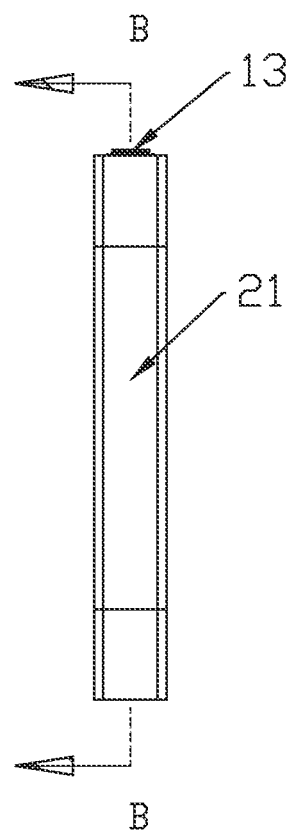
FIG. 4 is a side view of the haptic vibration device according to an embodiment of this application after installed in a terminal device.
Figure 5:
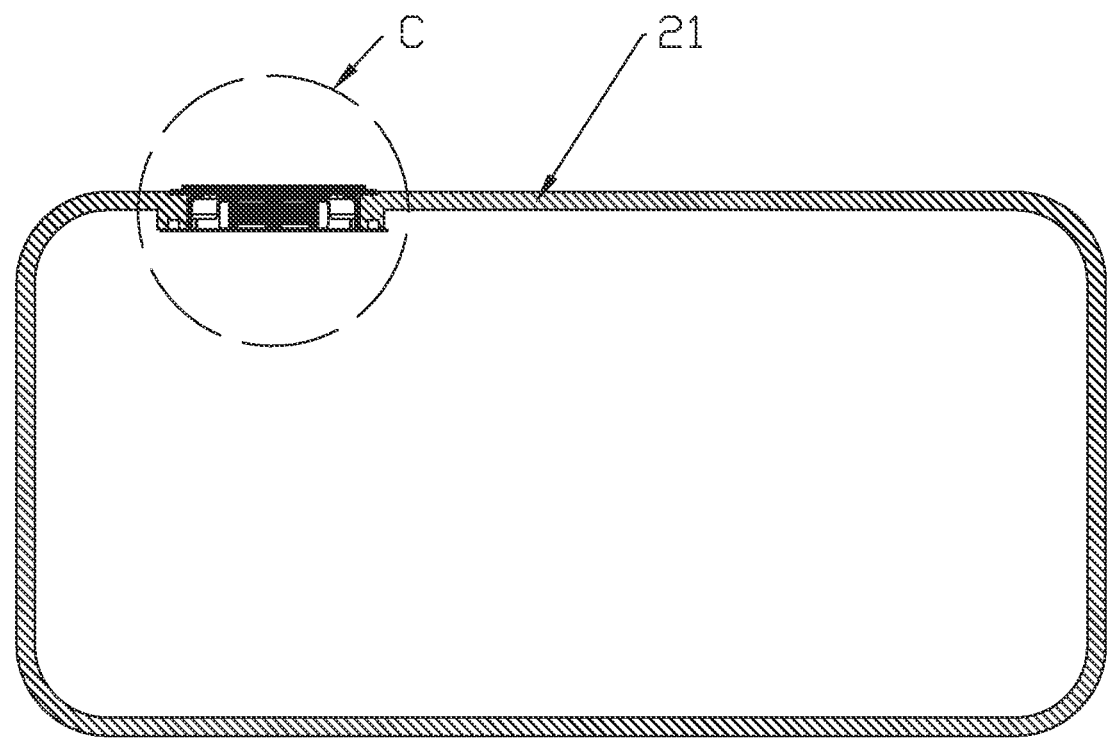
FIG. 5 is a sectional view of the haptic vibration device in FIG. 4 along B-B line.

Referring to FIGS. 1-3, an embodiment of this application further provides a terminal device including a casing 20 and the haptic vibration device 10 mounted in the casing 20. An outer side of the haptic vibration device 10 is exposed from an outer surface of the casing 20.

In this embodiment, the terminal device is a tablet device. The casing 20 includes a screen 22, a back plate 23 spaced from the screen 22, and a side frame 21 enclosing the edges of the screen 22 and the back plate 23. The screen 22, the back plate 23, and the side frame 21 together form a cavity. The haptic vibration device 10 is fixed to the side frame 21. The first direction is set along a thickness of the side frame 21, and the second direction is set along a length extension direction of the side frame 21. When the user presses the touch-control assembly 13 on the terminal device, the influence on the driving force of the haptic vibration device 10 in the non-pressing direction is reduced, such that the haptic vibration device 10 can be applied to different types of terminal devices.

In other embodiments, the terminal device is not limited to a tablet-type device, but may also be a handle, a keyboard, a steering wheel, and various other shaped devices. The haptic vibration device 10 may be fixed to any position on the casing 20, as long as it is ensured that when the haptic vibration device 10 is fixed to the terminal device, the space of the haptic vibration device 10 in the second direction is larger than the space in the first direction.

Further, referring to FIGS. 1-3, the touch-control assembly 13 protrudes from the surface of the casing 20, and the stator assembly 11 is fixed to the casing 20.

In this embodiment, the side frame 21 is provided with a boss 211 protruding toward the cavity in the thickness extension direction. The boss 211 is provided with a groove 212 along the thickness extension direction, and the groove 212 are open at both ends. There are two mounting protrusions 213 respectively protruding from two ends of the boss 21 toward the cavity along the thickness extension direction of the side frame 21. The two mounting protrusions 213 are in centrosymmetric arrangement. Two ends of the bottom plate 1111 are fixedly connected to the two mounting protrusions 213. Specifically, the bottom plate 1111 has two protruding columns protruding from both ends of the bottom plate 1111 toward the two mounting protrusions 213. The two mounting protrusions 213 are provided with two recesses matching the protruding columns, and the protruding columns are in interference fit with the recesses, respectively. In other embodiments, the bottom plate 1111 may also be screwed or glued to the mounting protrusions 213.

The two side plates 1212 of the shell 121 are spaced from an inner wall of the groove 212, so as to reserve space for elastic deformation and displacement of the two side plates 1212 in the second direction to facilitate vibration of the shell 121, so that the touch-control assembly 13 fixed to the shell 121 can vibrate with the shell 121, thereby providing the user with vibration in the second direction (non-pressing direction) when the user presses the touch-control assembly 13 in the first direction.

As can be known, compared to the terminal device in the related technology, the stator assembly 11 and the vibrator assembly 12 of the haptic vibration device 10 in this embodiment are housed within the terminal device, while the touch-control assembly 13 protrudes out of the surface of the terminal device, and the touch-control assembly 13 is directly connected to the vibrator assembly 12, so that the vibration changes experienced by the user are more obvious, and the vibration experience is better, and the non-press direction is not subjected to the effect of the force applied in the pressing direction, so that it can be adapted to a wide variety of terminal devices.

A side of the side frame 21 away from the cavity is recessed towards the cavity to form a mounting groove 214. The touch-control assembly 13 further includes a gasket 132 fixed in the mounting groove 214 and fitting the mounting groove 214. The gasket 132 is square shaped. The button 133 matches with the mounting groove 214, and is affixed to the gasket 132 on the side facing the cavity. A pressing portion protrudes from the side of the button 133 away from the cavity. Optionally, the gasket 132 is adhesively connected to the mounting groove 214, and the button 133 is adhesively connected to the gasket 132. The gasket 132 is not limited to a square shape, but may also be oval or other shapes. The gasket 132 may be a metal gasket, or a gasket made of silicone or rubber. The gasket 132 is used to secure the button 133, form a separation layer between the casing 20 and the button 133, and also to protect the button 133.

Figure 9:
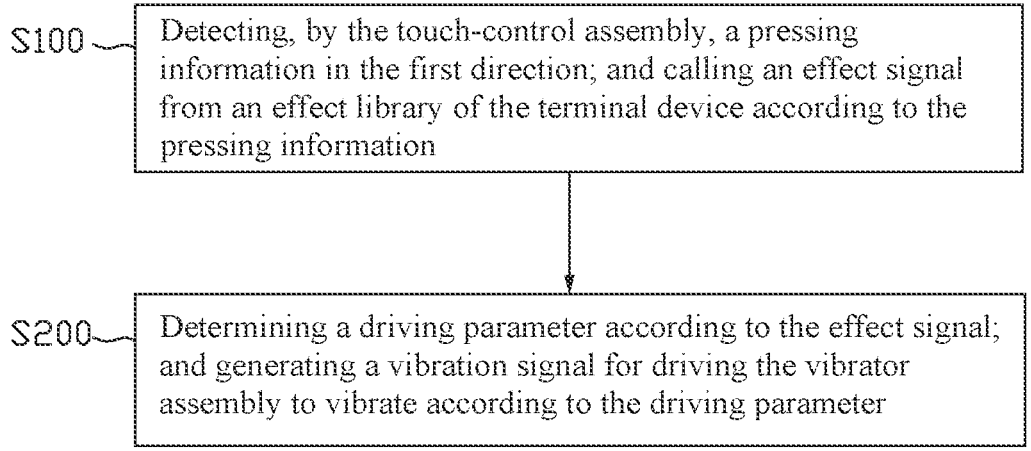
FIG. 9 is a flow chart of a control method according to an embodiment of this application.

Referring to FIG. 9, an embodiment of this application also provides a control method applied to the haptic vibration device 10, which includes the following steps.

(S100) The touch-control assembly 13 detects the pressing information in the first direction, and an effect signal is called from an effect library of the terminal device according to the pressing information.

(S200) A driving parameter is determined according to the effect signal, and a vibration signal for driving the vibrator assembly 12 to vibrate is generated based on the driving parameter.

In this embodiment, the step (S100) specifically includes the following steps.

(S101) The touch-control assembly 13 detects the pressing information in the first direction, where the pressing information at least includes position information and pressure information.

(S102) The effect signal is called from the effect library of the terminal device based on the position information and the pressure information, where the effect signal at least includes an effect signal of the button 133 and a slide key effect signal.

In this embodiment, the step (S200) specifically includes the following steps.

(S201) The driving parameter is determined according to the effect signal of the button 133 and the slide key effect signal.

(S202) The vibration signal that drives the vibrator assembly 12 to vibrate is generated according to the driving parameter.

Described above are only preferred embodiments of the present application, which are not intended to limit the present application. It should be noted that any variations, replacements and modifications made by those of ordinary skill in the art without departing from the spirit and scope of the present application shall fall within the scope of the present application defined by the appended claims.

What is claimed is:

1. A haptic vibration device, configured to be electrically connected to a terminal device and comprising:
    a stator assembly for fixing with the terminal device;
    a vibrator assembly arranged spacedly at a side of the stator assembly; and
    a touch-control assembly connected to a side of the vibrator assembly away from the stator assembly;
    wherein the touch-control assembly comprises a sensor and a button; the sensor is connected to a side of the vibrator assembly away from the stator assembly; and the button is configured to cover a side of the sensor away from the vibrator assembly; the touch-control assembly is configured to detect a pressing information in a first direction, which generated by pressing the button in a certain distance in the first direction;
    the stator assembly comprises a fixing frame assembly for fixing with the terminal device, and a magnetic circuit system fixed to the fixing frame assembly; and the magnetic circuit system has a magnetic gap therein;
    the vibrator assembly comprises a shell and a solenoid assembly; the shell is elastically connected to the fixing frame assembly, and is provided outside the magnetic circuit system; the solenoid assembly is fixed to the shell, and is located in the magnetic gap; the magnetic circuit system is configured to drive the solenoid assembly to reciprocate in a second direction; and the first direction is perpendicular to the second direction.

2. The haptic vibration device of claim 1, wherein the fixing frame assembly comprises a bottom plate for fixing with the terminal device, and a fixing frame; the fixing frame is fixedly connected to a side of the bottom plate facing toward the vibrator assembly; the fixing frame has a ring shape; and the shell is elastically connected to two ends of the fixing frame in the second direction, and is provided outside the fixing frame.

3. The haptic vibration device of claim 2, wherein each of two side walls of the fixing frame perpendicular to the second direction is configured to extend toward the vibrator assembly to form an extension portion; and the magnetic circuit system is fixed to an inner wall of the extension portion.

4. The haptic vibration device of claim 1, wherein the shell comprises a top plate spaced from the fixing frame assembly, and two side plates respectively extending from two ends of the top plate toward the stator assembly; the two side plates are elastic; and the two side plates are elastically connected to the fixing frame assembly in the second direction.

5. The haptic vibration device of claim 4, wherein the solenoid assembly comprises a pole core fixed to the top plate, and a plurality of coils sleeved on the pole core; the magnetic circuit system comprises a plurality of magnets fixed to the fixing frame assembly; and the plurality of magnets are distributed on two sides of the plurality of coils with the pole core as an axis.

6. The haptic vibration device of claim 5, wherein a magnetizing direction of each of the plurality of magnets is perpendicular to the second direction; and a magnetizing direction of one of the plurality of magnets located at one side of the plurality of coils is opposite to a magnetizing direction of one of the plurality of magnets located at the other side of the plurality of coils.

7. A terminal device, comprising:

a casing; and the haptic vibration device of claim 1;

wherein the haptic vibration device is arranged in the casing; and an outer side of the haptic vibration device is exposed from an outer surface of the casing.

8. The terminal device of claim 7, wherein the touch-control assembly protrudes from a surface of the casing; and the stator assembly is fixed to the casing.

9. A control method, applied to the haptic vibration device of claim 1, and comprising:

detecting, by the touch-control assembly, a pressing information in the first direction; and calling an effect signal from an effect library according to the pressing information;

and determining a driving parameter according to the effect signal; and generating a vibration signal to drive the vibrator assembly to vibrate according to the driving parameter.

* * * * *